July 25, 1972 A. M. ANDERSEN 3,679,498

METHOD FOR MOLDING FORMS ON VARIOUS SUBSTRATES

Filed May 14, 1970 2 Sheets-Sheet 1

INVENTOR.
ANTON M. ANDERSEN
BY Anthony A. Lucco
ATTORNEY

METHOD FOR MOLDING FORMS ON VARIOUS SUBSTRATES

Filed May 14, 1970 2 Sheets-Sheet 2

INVENTOR.
ANTON M. ANDERSEN

BY

ATTORNEY

United States Patent Office 3,679,498

Patented July 25, 1972

1

3,679,498

METHOD FOR MOLDING FORMS ON VARIOUS SUBSTRATES

Anton M. Andersen, 1 Highland Ave., Demarest, N.J. 07627

Filed May 14, 1970, Ser. No. 37,197
Int. Cl. B32b *31/14*
U.S. Cl. 156—3 16 Claims

ABSTRACT OF THE DISCLOSURE

A method for molding forms on substrates so that the forms and substrates are a homogeneous unit and whereby the forms originate as shaped parts or sheet stock in the raw state.

BACKGROUND OF THE INVENTION

Cross reference to related applications

The method of this invention may be performed by apparatus such as disclosed and claimed in co-pending U.S. application Ser. No. 8,263, filed Feb. 3, 1970, by Anton M. Andersen.

Field of the invention

This invention relates to a method for applying forms of thermoplastic materials to flat or arched substrates of related or unrelated materials. In particular, the invention relates to a method for providing a homogeneous molded form on the substrate. The forms may be of polymer or polymidic base and the substrate may be sheet metal, flat bar stock, supported or unsupported thermoplastic, absorbent and non-absorbent fabrics as synthetic yarns, cotton and wool yarns, glass fibers and flexible substrates such as closely woven metal wire mesh. This method is useful for, but not limited to, applying forms to industrial process belting and attachments thereto.

Description of the prior art

Prior to the present invention methods for applying flexible forms to substrates involved cementing forms of finished size and type on or in the substrate surface. Problems occurred due to the inadequacy of the bond and presizing and shaping of the forms was difficult and costly. Moreover, cementing is primarily a hand operation and is thus not economical. Methods using closed, vented molds have been employed for vulcanizing the form to the substrate. These methods have not been satisfactory since proper pressure, amount of molding load and free controlled flow of material are not assured. Further, spewing or overflowing of material requires costly finishing operations and curing has presented a problem since temperature variants which result when loading or unloading the mold do not assure adequate curing cycles and premature separation of the molded form from the substrate normally occurs.

SUMMARY OF THE INVENTION

This invention contemplates a method for molding forms on a substrate including the steps of preparing a predetermined area of the substrate, supporting a heated mold above the prepared substrate area, positioning a load of form material relative to the mold and prepared substrate area, bringing the mold, substrate and form material load into molding contact with each other and exerting pressure on the mold for a predetermined interval.

One object of this invention is to apply a form to a substrate, so that the form and substrate are a homogeneous unit.

Another object of this invention is to provide a method using a split mold to accomplish the above, and whereby

2 the adverse effect on curing occasioned by closed molds is virtually eliminated.

Another object of this invention is to avoid the necessity of preshaped and presized forms which are expensive and difficult to acquire within easily workable toleranes.

Another object of this invention is to provide a method which will apply across the width of the substrate a continuous form or a plurality of interrupted forms.

These and other objects and features of the invention will become more apparent from the following detailed description thereof wtih reference to the accompanying drawings.

DESCRIPTION OF THE DRAWINGS

In the drawings, wherein corresponding numerals indicate corresponding parts.

DESCRIPTION OF THE INVENTION

Figure 1:
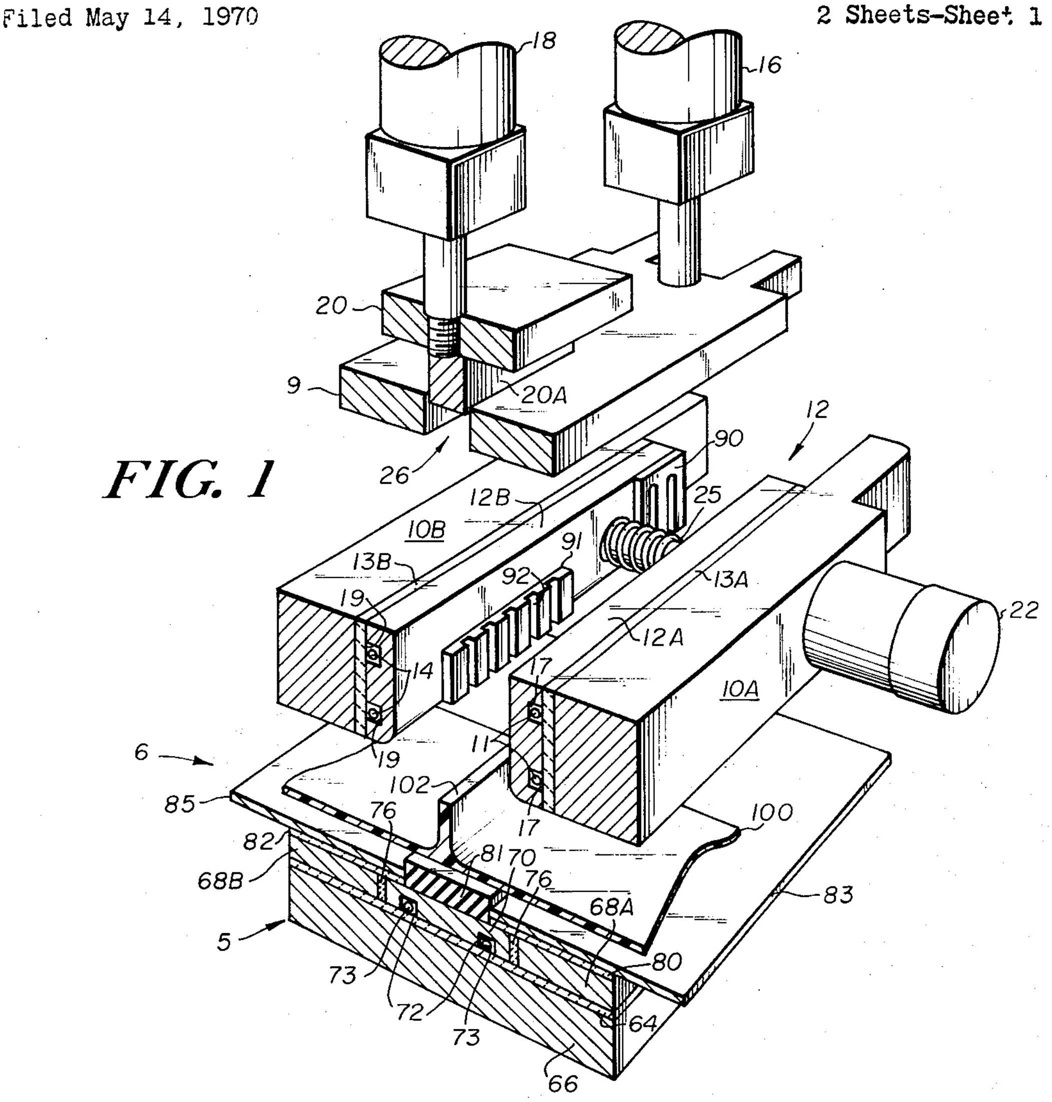
FIG. 1 is an isometric pictorial representation illustrating a first embodiment of the invention for applying a single form across the width of a substrate and showing a finished formed substrate in its proper position relative to apparatus for performing the method of the invention.
Figure 3:
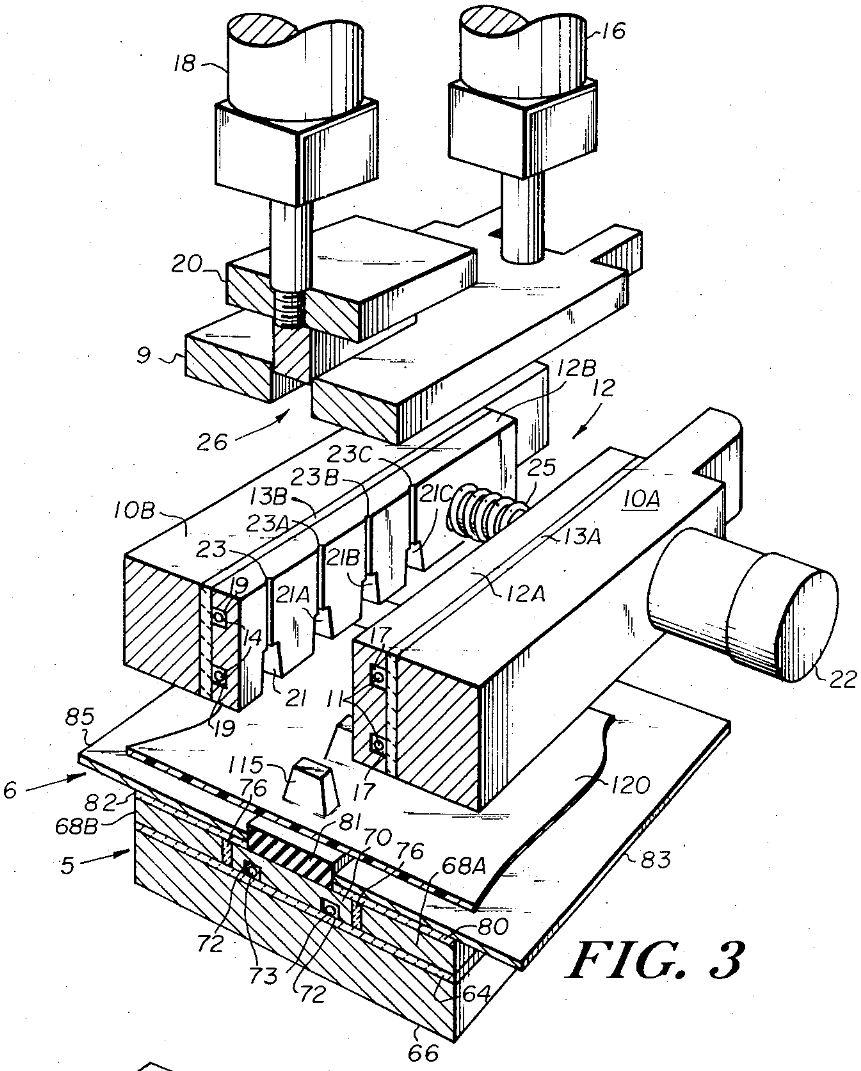
FIG. 3 is an isometric pictorial representation illustrating a second embodiment of the invention for applying a plurality of interrupted forms across the width of the substrate and showing a finished formed substrate in its proper position relative to apparatus for performing the method of the invention.

FIGS. 1 and 3 show a lower bed 5 and an upper bed 6. A pair of back-up plates 10A and 10B are disposed above beds 5 and 6 and support mold faces 12A and 12B of a split mold 12. Mold 12 is shown open in FIGS. 1 and 3.

A longitudinally movable pressure plate 9 is disposed above back-up plates 10A and 10B and mold 12, and a back-up pressure plate 20 is centered in pressure plate 9. In the embodiment of the invention shown in FIG. 1 back-up plate 9 is arranged to move longitudinally, independent of pressure plate 20 and in the embodiment shown in FIG 3 back-up plate 20 and pressure plate 9 move together as will hereinafter be more fully explained.

A hydraulic pressure cylinder 16 is located at one end of pressure pltae 9 and a similar pressure cylinder (not shown) is located at the other end. The hydraulic cylinders are arranged to move pressure plate 9 longitudinally.

A hydraulic pressure cylinder 18, disposed between the aforementioned pressure cylinders, is arranged to move back-up pressure plate 20 longitudinally. In the embodiment of the invention shown in FIG. 1, back-up pressure plate 20 moves independent of pressure plate 9 to exert pressure on a height spacer 91 and on the center of mold 12 as will hereinafter be more fully explained. In the embodiment of the invention shown in FIG. 3 back-up pressure plate 20 moves with pressure plate 9 and exerts pressure on the center of mold 12.

A hydraulic pressure cylinder 22 located at one end of mold back-up plate 10A and a similar pressure cylinder (not shown) located at the other end of back-up plate 10A are activated to move plates 10A and 10B, coupled by the ram of the pressure cylinders, laterally to close mold 12. A spring 25 surrounding the ram of pressure cylinder 22 and a similar spring surrounding the ram of the pressure cylinder not shown force plates 10A and 10B apart to open mold 12 when the pressure cylinders are de-activated.

It is to be noted the pressure plate 9, back-up plate 20 and mold back-up plates 10A and 10B may be actuated by pneumatic as well as hydraulic means, with the latter being referred to by way of example only. The specific structural relationship involved between the movable members and their respective actuating means are described in the aforenoted co-pending U.S. application Ser. No. 8,263.

Bed 5 includes, by way of example, but not by way of limitation, a base plate 66 of a metal such as aluminum and a sheet 64 of insulating material such as asbestos disposed on top of plate 66. Disposed on top of asbestos sheet 64 is a heater plate 70 which has channels 72 and heating elements 73 therein. The sides of the heater plate are lined with asbestos sheets 76 and metallic spacer plates 68A and 68B are disposed contiguous to asbestos sheets 76. Heating elements 73 may be coupled to suitable temperature control means (not shown).

Bed 6 includes a rubber bumper 81 of a suitable hardness, the purpose of which will be hereinafter described. Bumper 81 rests directly on heater plate 70 so as to be heated thereby. Asbestos sheets 80 and 82 are disposed on top of spacer plates 68A and 68B. Top plates 83 and 85 are positioned on top of asbestos sheets 80 and 82, respectively. Top plates 83 and 85 and asbestos sheets 80 and 82 are laterally adjustable to accommodate different size bumpers in accordance with the work being processed and to permit alignment of bumper 81 with the center of mold 12 as will hereinafter be understood.

With further reference to FIGS. 1 and 3, mold back-up plates 10A and 10B carrying mold faces 12A and 12B of mold 12, and which mold is disposed intermediate pressure plate 9 and bed 6, are arranged for longitudinal movement relative to bed 6 by means described in the aforenoted co-pending U.S. application Ser. No. 8,263. Further mold face 12A has channels 17 and heating elements 11 therein, and mold face 12B has channels 19 and heating elements 14 therein. Mold face 12A is separated from back-up plate 10A by an asbestos sheet 13A and mold face 12B is separated from back-up plate 108 by an asbestos sheet 13B. Heating elements 11 and 14 may be coupled to suitable temperature control means (not shown).

With reference first to FIG. 1, mold faces 12A and 12B are seen to be rectangular plates and are effective for molding a single form 102 across the width of a substrate by a method to be hereinafter described to provide a formed substrate 100. With reference next to FIG. 3, mold face 12A carries a plurality of cavities shown, by way of example, as four in number and designated by the numerals 21, 21A, 21B, and 21C. Each of the mold cavities has a corresponding vent hole 23, 23A, 23B and 23C extending from the top of the cavity to the top of the mold face. Mold face 12B has similar and corresponding cavities and vent holes which are not shown in the view of FIG. 3 and which cooperate with cavities 21 through 21C and vent holes 23 through 23C to mold a plurality of forms 115 across the width of a substrate to provide a formed substrate 120.

Method of the invention

In performing the method of the invention, the area of a substrate 110 (FIGS. 2 and 4), which is to have form 102 (FIG. 1) or forms 115 (FIG. 3) applied thereto, is first prepared. This is accomplished by chemical etching in the case of metallic substrates, washing with a suitable thermoplastic solvent in the case of fabric substrates and the mechanical removal of the substrate surface to form a channel 111 (FIGS. 2 and 4) in the case of thermoplastic solid or covered substrates.

Figure 2:
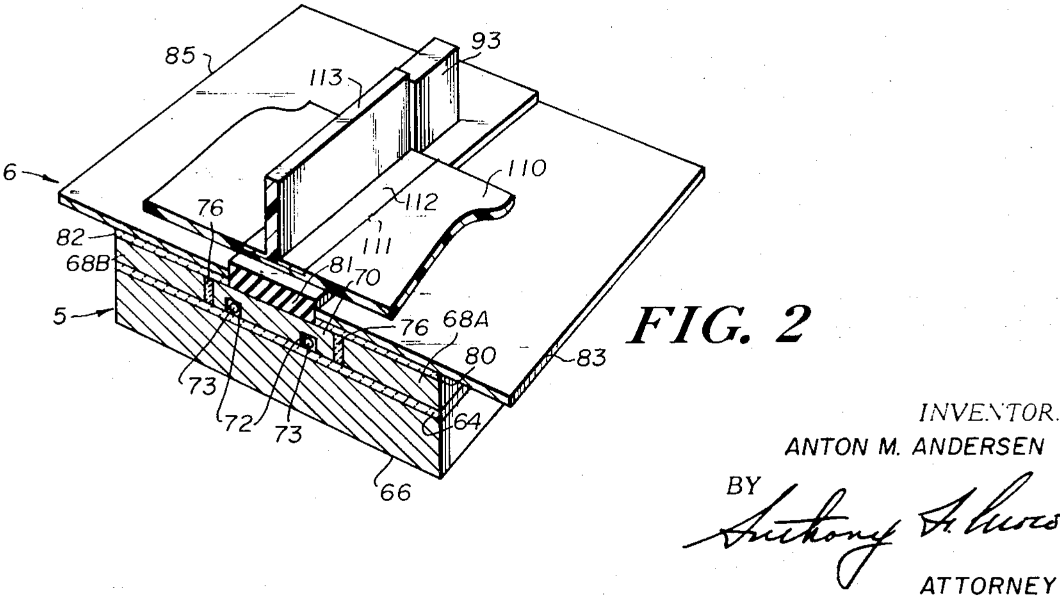
FIG. 2 is an isometric pictorial representation illustrating a prepared substrate and showing a continuous load of form material across the width thereof and showing the prepared substrate positioned relative to supporting beds.
Figure 4:
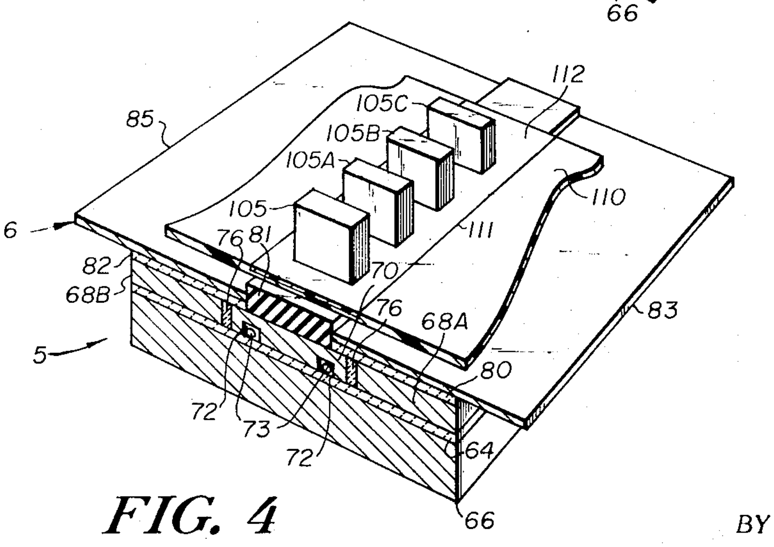
FIG. 4 is an isometric pictorial representation illustrating a prepared substrate with a plurality of interrupted loads of form material across the width thereof and showing the prepared substrate positioned relative to supporting beds.

Referring specifically to FIGS. 2 and 4, substrate 110 is positioned on bed 6 with the prepared area centered over bumper 81. Adjustable plates 83 and 85 and asbestos sheets 80 and 82 cooperate with bumper 81 to contain overflow at the base of mold faces 12A and 12B when mold 12 is lowered to bed 6 and downward pressure is applied. Bumper 81 is 1/8 inch wider at each edge than the prepared substrate area and is also 1/8 inch thicker than the channel formed by plates 83, 85 and asbestos sheets 80, 82 within which the bumper is contained. When lowered into position to mold form 102 (FIG. 1) or forms 115 (FIG. 3), the base of mold 12 overlaps by 1/8 inch the edge of each side of the prepared substrate area to contain downward molding pressures exerted by pressure plates 9 and 20.

With substrate 110 positioned as noted, a base strip 112 (FIGS. 2 and 4) of raw molding material is placed over the prepared area or into channel 111 provided on the substrate, as the case may be. Base strip 112 is as thick, as wide and as long as channel 111 provided as aforenoted in the case of thermoplastic materials. When the substrate is prepared by etching or abrading, base strip 112 is a flat, thin strip of raw molding material positioned on the prepared substrate area.

Referring now to FIG. 2, a vertical riser 113 of raw molding material is positioned upright on base strip 112 and centered thereon. Riser 113 is oversized by approximately 5 to 15 percent relative to finished form 102 depending on the form shape and size.

End bumpers such as the end bumper 93 are placed at each end of the riser, with only the rear end bumper shown in FIG. 2. The end bumpers are of a resilient material such as silicone rubber and are of a height less than the height of the finished molded form 102 and of a thickness approximately .015 inch over the thickness thereof. The purpose of the end bumpers is to contain vertical riser 113 at each end thereof during the molding process.

With substrate 110, base strip 112, vertical riser 113 and end bumpers 93 positioned as noted, mold 12, in the open position as shown in FIG. 1, is lowered to rest on top of substrate 110 and to encompass vertical riser 113 and bumpers 93. Height spacer 91 (FIG. 1) is inserted between mold faces 12A and 12B and rests on top of vertical riser 113. Height spacer 91 may be of Teflon or other similar, suitable material and has venting grooves 92 therein. The height spacer is as thick as finished molded form 102 and has a height equal to the difference in height between the required height of the finished molded form and the overall height of the mold face. For example, with a 3 inch mold face and using a spacer 91 two inches high, the result will be a finished form 102 which is 1 inch high.

Mold faces 12A and 12B are now brought together by activating appropriate pressure cylinders as heretofore noted. Mold faces 12A and 12B will have a space between them equal to the thickness of a spacer 90 inserted between the mold faces at one end and a similar spacer at the other end (not shown). For example, if spacers 90 are 1/4 inch thick, then mold faces 12A and 12B will have a space between them of 1/4 inch and the finished form 102 will be 1/4 inch thick. Spacers 90, then, are used to control the thickness of the finished form.

Vertical riser 113, being oversized in all dimensions as heretofore noted, compresses and the excess material is forced upward, pushing height spacer 91 above the top of mold 12. The end bumpers 93 compress, sealing off the ends of the mold.

Pressure plate 9 is now displaced downward by activating appropriate pressure cylinders and thereby applies downward pressure to the center of mold 12 for effectively sealing off the bottom of the mold. Pressure plate 9 has a slot 26 therein which receives height spacer 91.

Back-up pressure plate 20 is now displaced downward by activation of the appropriate pressure cylinder. Back-up pressure plate 20 has a T-shaped section as seen in FIGS. 1 and 2, with bottom leg 20A of the section equal in length to the thickness of pressure plate 9. When plate 20 is displaced downward, leg 20A rests on top of mold 12 and forces height spacer 91 downward to exert pressure on riser 113 (FIG. 2).

With mold 12 closed and pressure plates 9 and 20 lowered, vertical riser 113 is now under compression and a molding cycle begins. Venting is achieved through venting grooves 92 in height spacer 91 and over the top of the end bumpers 93 shown in FIG. 2.

Molding pressure and cycle time are predetermined in accordance with the material in use. Pressure may range, for example, from 25 to 750 p.s.i. and curing times may range from 5 to 15 minutes.

When the molding cycle is completed, appropriate pressure cylinders are deactivated causing first pressure plate 20 and then pressure plate 9 to rise away from mold 12 and finally causing mold faces 12A and 12B to be displaced apart to open mold 12. Mold 12 and pressure plates 9 and 20 are raised away from bed 6 as described in the aforenoted co-pending U.S. application Ser. No. 8,263 and the molded form is exposed. Height spacer 91 and end bumpers 93 are removed and vertical riser 113, base strip 112 and substrate 110 are one homogeneous unit. Overflow is removed by buffing, slitting or cutting.

In the method for applying a plurality of forms 115 across the width of the substrate to provide formed substrate 120 (FIG. 3), mold faces 12A and 12B having cavities 21, 21A, 21B and 21C therein are used. In one form of the method, form material is loaded directly into the mold cavities. Thus, while mold 12 is in the raised position above the substrate, appropriate pressure cylinders are activated for closing mold faces 12A and 12B. Mold spacer 90 (FIG. 1) is not used and the mold faces therefore touch to cause complete sealing off of all sides of the cavities 21, 21A, 21B and 21C with the exception of the bottom of the cavities and the vent holes 23, 23A, 23B and 23C in said cavities. Precut raw molding material, which is oversized by approximately 5 to 20 percent relative to the finished form and dependent on the final shape and size of the form, is placed into the cavities.

Mold 12, so closed and loaded, is lowered to rest on top of substrate 110 which has been prepared and centered on bed 6 as previously noted. Appropriate pressure cylinders are activated and pressure plate 9 and back-up pressure plate 20 are displaced downward together for exerting a downward pressure on mold 12, after which the molding cycle begins.

In another form of the method, referring now to FIG. 4, raw precut molding forms 105, 105A, 105B and 105C are placed on top of base strip 112 and positioned to be in line with respective cavities 21 to 21C in mold 12. Mold 12, in the open position, is lowered to rest on top of substrate 110 and mold faces 12A and 12B are now brought together by activating hte appropriate pressure cylinders whereby forms 105–105C are encompassed by cavities 21–21C. Pressure plate 9 and back-up pressure plate 20 are next displaced together for exerting a downward pressure on the mold, after which the curing cycle begins. Venting is achieved through vent holes 23, 23A, 23B and 23C.

When the molding cycle is completed, appropriate pressure cylinders are deactivated causing pressure plates 20 and 9 to rise away together from the mold and causing mold faces 12A and 12B to be displaced apart to open mold 12. Mold 12 and pressure plates 20 and 9 are now raised away from bed 6 as described in the aforenoted co-pending U.S. application Ser. No. 8,263, and formed substrate 120 is exposed. The form material loads, base strip and substrate are a homogeneous unit. Overflow is removed by buffing, slitting or cutting.

It will now be understood by those skilled in the art that various changes may be made in performing the method of the invention without departing from the spirit and scope thereof. For example, the forms may be applied at any given interval, fixed or otherwise, with ease of adaptability with respect to change of centers, length and form.

As heretofore noted, the form material may be loaded on the prepared substrate area for a continuous form across the width of the substrate or, in the case of intermittent forms across the substrate, the closed mold may be loaded. In the case of simple continuous forms, form height is regulated by inserting spacers between the mold faces.

The mold material may be in the form of preshaped parts, slugs of raw material or raw sheet stock and the substrate may be flexible or rigid. Venting is enhanced since it is accomplished through the center of the two halves of the mold and cleaning of vents occurs automatically when the mold faces are parted preventing blocking of the vents.

With the above in mind, reference is to be had to the appended claims for a definition of the limits of the invention.

What is claimed is:

1. A method for molding forms to a substrate, comprising:
- cleaning a substrate area;
- heating the cleaned substrate area;
- supporting a heated mold above the cleaned substrate area;
- positioning a load of form material relative to the mold and cleaned substrate area;
- bringing the mold, cleaned substrate area and form material into molding contact with each other; and
- exerting pressure on the mold to mold the forms to the substrate, with the forms and substrate becoming a homogeneous unit.

2. A method as described by claim 1, wherein positioning a load of form material relative to the mold and cleaned substrate area includes:
- positioning a flat, thin strip of raw form material on the cleaned substrate area; and
- positioning a vertical riser of raw form material on the thin strip thereof.

3. A method as described by claim 2, including: positioning a height spacer on top of the vertical riser for controlling form height.

4. A method as described by claim 3, including: positioning end bumpers at each end of the vertical riser for containing flow of the outer ends of the form material when exerting pressure on the mold.

5. A method as described by claim 4, wherein the mold has a pair of faces in spaced relation to each other, and bringing the mold, cleaned substrate area and form material into molding contact includes:
- lowering the mold to the substrate; and
- bringing the mold faces together to encompass the flat, thin strip of raw form material, the vertical riser and the end bumpers.

6. A method as described by claim 5, including: inserting spacers between the mold faces to control the width of the form.

7. A method as described by claim 6, wherein exerting pressure on the mold to mold the forms to the substrate, with the forms and substrate becoming a homogeneous unit includes:
- exerting a downward pressure on the mold faces; and
- exerting a downward pressure on the vertical riser.

8. A method as described by claim 1, including: positioning the substrate so that the cleaned area thereof is centered over a resilient member for containing pressure on the substrate to an area defined by the resilient member when exerting pressure on the mold.

9. A method as described by claim 1, wherein the mold has cavities to provide the shape of the form, and positioning a load of form material relative to the mold and cleaned substrate area includes:

positioning a thin strip of raw form material on the cleaned substrate area; and positioning slugs of form material on the thin strip and in line with the cavities in the mold.

10. A method as described by claim 1, wherein the mold has cavities to provide the shape of the form, and positioning a load of form material relative to the mold and cleaned substrate area includes:

positioning a thin strip of raw form material on the cleaned substrate area; and inserting slugs of raw form material into the cavities in the mold.

11. A method as described by claim 9, wherein bringing the mold, cleaned substrate area and form material into molding contact with each other includes: lowering the mold to the cleaned substrate area so that the mold cavities encompass the slugs of raw form material when the mold rests upon the thin strip of form material.

12. A method as described by claim 10, wherein bringing the mold, cleaned substrate area and form material into molding contact with each other includes: lowering the mold with the slugs of raw form material in the cavities therein to the substrate area to rest upon the thin strip of raw form material.

13. A method as described by claim 11, wherein exerting pressure on the mold to mold the forms to the substrate, with the forms and substrate becoming a homogeneous unit includes:

exerting a downward pressure on the mold faces; and exerting a downward pressure on the center of the mold.

14. A method as described by claim 1, wherein cleaning a substrate area includes: washing the substrate area with a solvent.

15. A method as described by claim 1, wherein cleaning a substrate area includes: chemically etching the substrate area.

16. A method as described by claim 1, wherein the step of cleaning a substrate area includes: mechanically removing the substrate surface to form a channel.

References Cited

UNITED STATES PATENTS

| | | | |
|---|---|---|---|
| 3,379,603 | 4/1968 | Barnette | 156—245 |
| 3,480,501 | 11/1969 | Burch | 156—245 |

CARL D. QUARFORTH, Primary Examiner

S. J. LECHERT, JR. Assistant Examiner

U.S. Cl. X.R.

156—153, 245, 306, 322; 264—259